United States Patent
Adolph et al.

(10) Patent No.: US 7,653,284 B2
(45) Date of Patent: Jan. 26, 2010

(54) METHOD AND APPARATUS FOR EDITING A DATA STREAM

(75) Inventors: Dirk Adolph, Ronnenberg (DE); Uwe Janssen, Seelze (DE); Hui Li, Hannover (DE); Harald Schiller, Hannover (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 789 days.

(21) Appl. No.: 10/879,842

(22) Filed: Jun. 29, 2004

(65) Prior Publication Data
US 2005/0022254 A1 Jan. 27, 2005

(30) Foreign Application Priority Data
Jul. 1, 2003 (EP) .................................. 03403201

(51) Int. Cl.
G11B 27/00 (2006.01)
H04N 5/93 (2006.01)
H04N 5/91 (2006.01)
H04N 7/00 (2006.01)

(52) U.S. Cl. ............................. 386/52; 386/53; 386/55; 386/95

(58) Field of Classification Search ................... 386/52, 386/53, 55, 95; 715/719, 726
See application file for complete search history.

(56) References Cited

U.S. PATENT DOCUMENTS

| | | | | |
|---|---|---|---|---|
| 5,239,617 A * | 8/1993 | Gardner et al. | ................. | 706/11 |
| 5,613,079 A * | 3/1997 | Debique et al. | ............. | 711/141 |
| 6,573,907 B1 * | 6/2003 | Madrane | ...................... | 715/719 |
| 7,020,381 B1 * | 3/2006 | Kato et al. | ..................... | 386/52 |
| 7,280,738 B2 * | 10/2007 | Kauffman et al. | ............. | 386/52 |
| 7,289,717 B1 * | 10/2007 | McGrath et al. | .............. | 386/52 |
| 7,362,946 B1 * | 4/2008 | Kowald | ....................... | 386/52 |
| 7,409,144 B2 * | 8/2008 | McGrath et al. | ............ | 386/117 |
| 7,493,014 B2 * | 2/2009 | McGrath et al. | .............. | 386/68 |
| 2002/0140816 A1 * | 10/2002 | McGrath et al. | ............ | 348/180 |
| 2003/0052910 A1 * | 3/2003 | Shiiyama | .................... | 345/719 |

(Continued)

FOREIGN PATENT DOCUMENTS

EP 1102276 5/2001

(Continued)

OTHER PUBLICATIONS

European Search Report of EP 03 40 3201 dated Nov. 24, 2003.

(Continued)

*Primary Examiner*—Thai Tran
*Assistant Examiner*—Hung Q Dang
(74) *Attorney, Agent, or Firm*—Robert D. Shedd; Harvey D. Fried; Joel M. Fogelson

(57) ABSTRACT

The invention relates to a method of editing a data stream, the data stream having a first unique identifier of an identifier space and having assigned metadata, the metadata comprising meta information and a metadata link, the metadata link comprising the first unique identifier and at least one data packet identifier. When performing an editing operation on the data stream, a second unique identifier of the identifier space is assigned to the data stream and the first unique identifier for a resolver task is stored, using a decision metric for updating the meta link.

10 Claims, 4 Drawing Sheets

U.S. PATENT DOCUMENTS

2003/0233359 A1* 12/2003 Adolph et al. .................. 707/6
2005/0152665 A1* 7/2005 Shibata et al. .................. 386/4

FOREIGN PATENT DOCUMENTS

EP  1 372 343 A2  12/2003

OTHER PUBLICATIONS

K. Jung, et al., Request for UUID Registration of IPTC Information (Revised), ISO/IEC JTC 1/SC 29/WG1 document register N2600, Jul. 19, 2002, Santa Clara, California.

The Open Group, Universal Unique Identifier, DCE 1.1: Remote Procedure Call—Universal Unique Identifier, 1997, pp. 1-7.

* cited by examiner

| cases of stream editing \ affected MD links | ① | ② | ③ | ④ | ⑤ | ⑥ |
|---|---|---|---|---|---|---|
| A Cut Head | not affected | shift right | shift right | ✕ | ✕ | delete link |
| B Cut Tail | not affected | delete link | ✕ | shift left | ✕ | delete link |
| C Split | point to new UUID | shift right to 2nd stream | shift right to 2nd stream | shift left to 1st stream | 2 links 2 ranges | delete link |
| D Cut & Merge | not affected | shift to boundary | shift to boundary | shift to boundary | not affected | delete link |

Fig. 4

METHOD AND APPARATUS FOR EDITING A DATA STREAM

This application claims the benefit, under 35 U.S.C. § 365 of European Patent Application 03403201.1, filed Jul. 1, 2003.

FIELD OF THE INVENTION

The invention relates to the field of editing data streams, and more particularly to data streams having assigned metadata.

BACKGROUND OF THE INVENTION

Using an universal unique identifier (UUID) for encoding metadata is known from the prior art, cf. http://www.jpeg.org/metadata/wgln2600.doc. An UUID is an identifier that is unique in respect to the space of all UUIDs. A UUID can be used for multiple purposes, from tagging objects with an extremely short lifetime, to reliably identifying very persistent objects across a network.

The generation of UUIDs does not require a registration authority for each single identifier. Instead, it requires a unique value over space for each UUID generator. This spatially unique value is specified as an IEEE 802 address, which is usually already applied to network-connected systems. This 48-bit address can be assigned based on an address block obtained through the IEEE registration authority. This UUID specification assumes the availability of an IEEE 802 address, see http://www.opengroup.org/onlinepubs/9629399/apdxa.htm. That specification also discloses algorithms for UUID generators.

Further, patent application EP-A-1372343 shows a method for using UUIDs in the context of streaming applications.

SUMMARY OF THE INVENTION

The invention provides an improved editing of a data stream which also encompasses the updating of the metadata that is assigned to the data stream. The invention facilitates editing a data stream, the data stream having a unique identifier and assigned metadata, whereby the data stream can be edited independently from the metadata corresponding thereby updating the metadata correspondingly, if necessary. The updating operation, if any, is determined by means of a decision matrix or metric.

When the data stream is edited1 the original unique identifier of the data stream is replaced with a new one. The former unique identifier is stored in metadata history data. This is necessary in order to map the unique identifier of metadata which has not been updated in accordance with their decision matrix to the new unique identifier. In accordance with a preferred embodiment of the invention the unique identifiers are generated in accordance with the UUID specification.

In accordance with a further preferred embodiment of the invention the updating operation as determined by means of the decision matrix is output as a suggestion for a user. The user can accept the suggested updating operation or decline the suggestion in order to specify a user selected updating alternative.

In principle, the inventive method is suited for editing a data stream, the data stream having a first unique identifier of an identifier space and having assigned metadata, the metadata comprising meta information and a metadata link, the metadata link comprising the first unique identifier and at least one data packet identifier, the method including the steps of:

performing an editing operation on the data stream;
assigning a second unique identifier of the identifier space to the data stream;
storing the first unique identifier for a resolver task;
using a decision matrix for updating the metadata link.

In principle the inventive apparatus operates for editing a data stream, the data stream having a first unique identifier of an identifier space and having assigned metadata, the metadata comprising meta information and a metadata link, the metadata link comprising the first unique identifier and at least one data packet identifier, the apparatus including:

means for performing an editing operation on the data stream;
means for assigning a second unique identifier of the identifier space to the data stream;
means for storing the first unique identifier as history data for a resolver;
a decision matrix for updating the metadata link in accordance with the editing operation.

BRIEF DESCRIPTION OF THE DRAWINGS

Exemplary embodiments of the invention are described with reference to the accompanying drawings:

FIG. 4 a decision matrix.

DETAILED DESCRIPTION OF PREFERRED EMBODIMENTS

Figure 1:
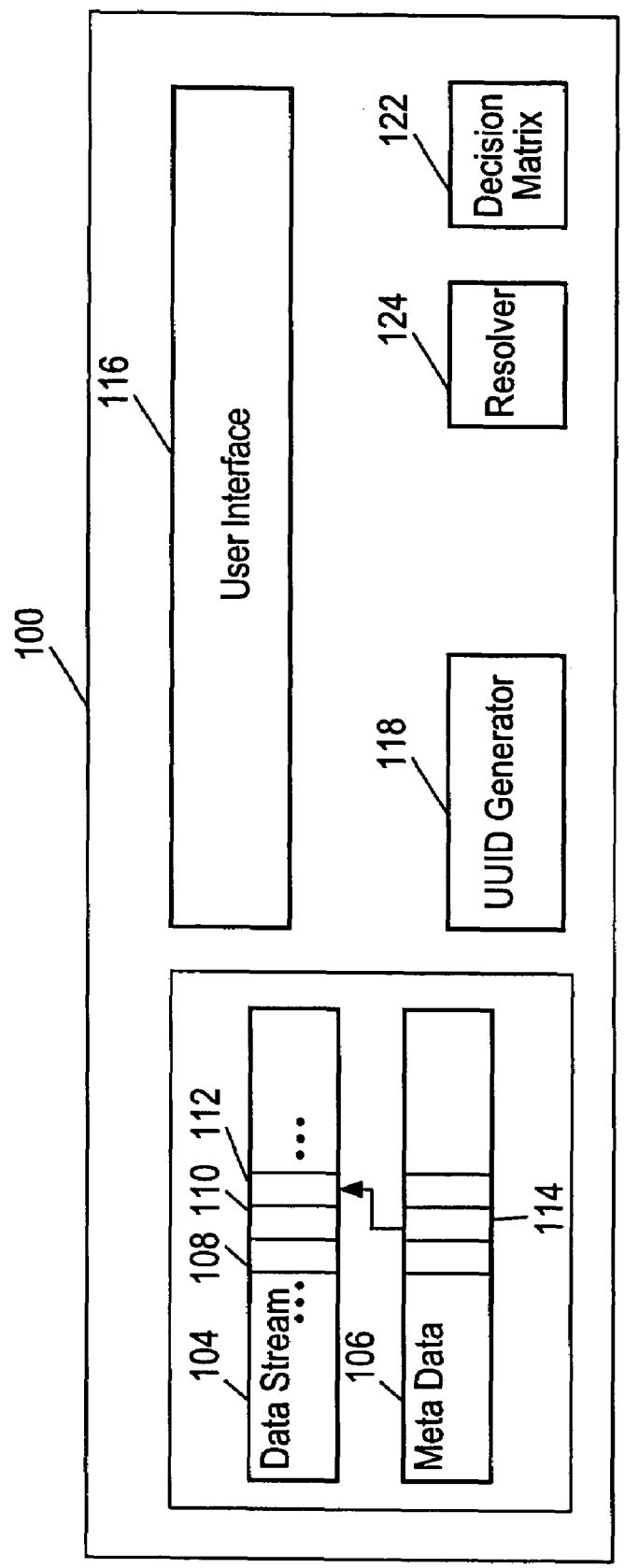
FIG. 1 block diagram of an editing apparatus for a data stream.

FIG. 1 shows a block diagram of an editing apparatus 100, such as a DVB Blue-ray Disc (BD), or recorder. Editing apparatus 100 has storage 102 for storing data stream 104 and metadata 106.

Data stream 104 consists of a sequence of data packets 108, 110, 112, . . . . These data packets each have a data packet identifier (ID) for identifying the data packet within data stream 104.

Each entry in metadata 106 is a tuple of the meta information and the metadata link. The meta information can be any information regarding the data stream 104 which can be of interest for a user. For example, the meta information can contain the text for a subtitle when the data stream is a video sequence. Another example is that the meta information contains information on the actors or other background information of the movie.

The metadata link has one or more data packet identifiers to identify the data packet within data stream 104 to which the meta information is assigned. The data stream to which the data packet identifier belongs is identified by the UUID of that data stream, i.e. data stream 104 in the example considered here.

For example, tuple 114 contained in metadata 106 has a metadata link comprising the UUID of data stream 104 and the data packet identifier of data packet 112 contained in data stream 104. This way the meta information contained in tuple 114 is unequivocally assigned to data packet 112.

Editing apparatus 100 includes a user interface 116 by means of which a user can edit data stream 104 which is stored in storage 102. This encompasses various editing operations, such as cut head, cut tail, split, and cut and merge operations, as will be explained in more detail below with reference to FIG. 2. The editing of the data stream 104 is performed independently of metadata 106. The edited data stream 104 is assigned to another UUID. The new UUID is provided by UUID generator 118. The former UUID of data stream 104 is stored in history data. History data belongs to metadata 106. Each object having an UUID also has history data which carries old or outdated UUIDs which had been previously assigned to the object but which are no longer valid. The old UUIDs are stored in order to enable mapping to the new UUIDs.

After an editing operation has been performed with respect to data stream 104 it is determined by means of decision matrix 122 whether an updating operation of metadata 106 is required, and if so, which updating operation is to be performed. FIG. 4 shows an example for such a decision matrix.

Resolver 124 can access history data to provide a link resolution mechanism. For example, when data stream 104 has been edited and it has been decided by means of decision matrix 122 that no updating of metadata 106 is required, data stream 104 has a new UUID while the UUID of the metadata link of tuple 114 still remains the same. Through the intermediary of resolver 124 and history data it is ensured that tuple 114 is still unequivocally assigned to data packet 112 of data stream 104.

In operation a user performs an editing operation through user interface 116. This invokes UUID generator 118 which provides a new UUID for data stream 104. The former UUID of data stream 104 is stored in history data.

By means of decision matrix 122 it is determined whether updating of metadata 106 is required, and if so, which updating operation or updating operations need to be performed. The updating operation or the updating operations can be performed automatically. Alternatively the updating operation or the updating operations are output as a suggestion via user interface 116. The suggestion provided by decision matrix 122 can be accepted, modified or declined by a user. During playback of edited data stream 104 the metadata contained in tuple 114 need to be accessed. As the UUID contained in tuple 114 does not belong to any valid data stream anymore, resolver 124 is invoked which maps the UUID contained in tuple 114 to the new UUID of data stream 104.

Figure 2:
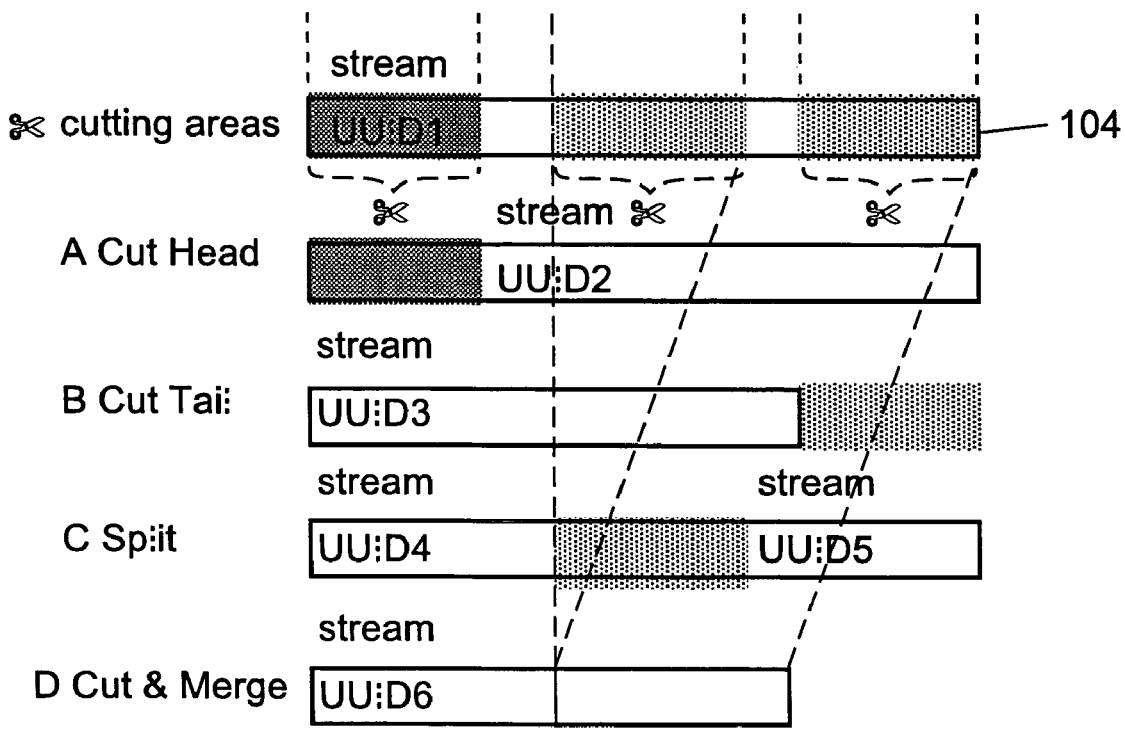
FIG. 2 various editing operations performed on the data stream.

FIG. 2 shows a general overview about stream editing. The idea is, that any editing process affecting metadata links can be reduced to a single or a repeated selection out of the four cases A to D. For example the appending of a stream was omitted, because a metadata link pointing into the stream must not be changed for keeping consistency of metadata and essence. Also the case of changing the content instead of cutting it out are commutable.

The topmost data stream in FIG. 2 shows the original data stream 104 before editing. Every stream is marked by an UUID (Universally Unique Identifier; IETF draft from Feb. 4, 1998) by which it can be identified independently from its location. Any change of the stream as depicted in the four different cases A to D will generate a new UUID manifesting that the content is now a different one.

The distinction between the four cases A to D is created by the position of the cutting area and the treatment of emerging stream fragments. In case A and B the very beginning or quite the last part of the AV stream have been deleted. Thus the cases are named "Cut Head" and "Cut Tail". In case C and D the middle of the stream has been cut out, leaving the two fragments. By the way of further handling the two emerging fragments the case "Split" and the case "Cut & Merge" are distinguished. Case C "Split" will generate two independent streams both having its own UUID and case D will paste together the fragments, both having only one new UUID. Metadata links can be affected by these editing operations: There are two types of metadata links, point links and range links. A point link describes a connection of a metadata item into an AV stream for a specific location on the time axis, e.g. for a specific picture in a video sequence. A range link, however, describes a connection of a metadata item into an AV stream for a specific segment on the time axis, e.g. for a chapter of a movie. While a point link specifies a start time only, the range link specifies a start time and an end time on the time axis by indicating the corresponding start and end data packet identifiers. Both metadata link types also include the simple case of a general link for metadata, which is a link relating to the complete data stream as long it is existing and which does not determine any picture or segment. A range link covering the full AV stream, i.e. having the start time and the end time of the AV stream itself, is the adequate representation.

Figure 3:
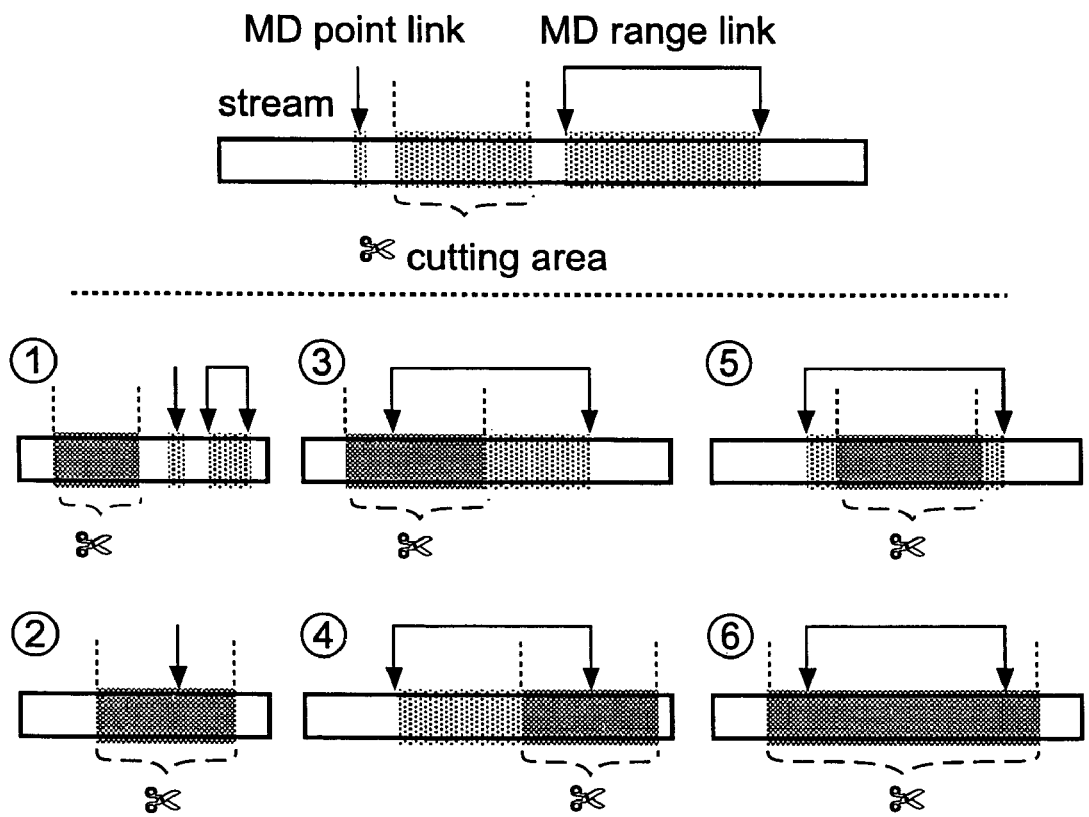
FIG. 3 how different editing operations can affect metadata links.

FIG. 3 depicts six different implications on metadata (MD) links due to modifications within the AV stream. In principle the six cases are created by different arrangements of the two links and the cutting area. Case No. 1 shows an editing operation with unaffected point and range links. No. 2 is the single case for an affected metadata point link. And Nos. 3 to 6 depict affected metadata range links only: No. 3 is a range affected in the beginning, No. 4 is affected at the end, No. 5 is affected inwards and No. 6 is a range affected in totally. By combining the cases of stream editing with the cases of affected metadata links, a matrix is created encompassing all possibilities.

Such a decision matrix is shown in FIG. 4 by way of example. The matrix shows the cases of affected metadata (MD) links in horizontal and the cases of stream editing in vertical direction. The cross points of the matrix show the resulting modification. The decision matrix shows by way of example the rules for metadata link adoption to keep relations between metadata and essence consistent. The grey-shaded links indicate that a shift on the time axis has been executed for adaptation.

For example if a case No. 1 of FIG. 3 is present due to a cut head editing operation of type A, no updating of the metadata is required. In contrast an editing operation of type C in combination with case No. 1 requires that the metadata is updated. This is because the splitting of the original data stream results in the creation of two new UUIDs for both fragments of the data stream. It is therefore required to replace the UUID of the metadata link by one of the new UUIDs in order to unequivocally assign the corresponding tuple to one of the fragments. In addition this case requires that the data packet IDs within the metadata link are updated correspondingly.

A more detailed explanation of each individual element of the decision matrix is given in the following:

A1: The METADATA range link or METADATA point link is not affected by the editing, else no action necessary.

B1: See A1.

C1: The DATA stream has been split. Ensure that the pointer are referencing to the new UUID.

D1: See A1.

A2: Shift the time position on the time axis to a later time. This time must describe the first picture or audio frame decodable within the DATA stream. Typically this is referenced by a time stamp.

B2: The position is lost, else delete the METADATA point link. If the metadata belonging to the link does not have any other link and if it is not protected against deletion, then delete also the metadata, cf. FIG. 5.

C2: The DATA stream has been split. Shift the time position on the time axis to a later time. This time must describe the first picture or audio frame decodable within the DATA stream. Typically this is referenced by a time stamp. Ensure that the pointer is referencing to the new UUID.

D2: See A2.

A3: Shift the start time position on the time axis to a later time. This time must describe the first picture or audio frame decodable within the DATA stream. Typically this is referenced by a time stamp.

B3: Not possible.

C3: The DATA stream has been split. Shift the start time position on the time axis to a later time. This time must describe the first picture or audio frame decodable within the DATA stream. Typically this is referenced by a time stamp. Ensure that the pointer is referencing to the new UUID.

D3: See A3.

A4: Not possible.

B4: Shift the end time position on the time axis to an earlier time. This time must describe the last picture or audio frame decodable within the DATA stream. Typically this is referenced by a time stamp.

C4: The DATA stream has been split. Shift the end time position on the time axis to an earlier time. This time must describe the last picture or audio frame decodable within the DATA stream. Typically this is referenced by a time stamp. Ensure that the pointer is referencing to the new UUID.

D4: See B2.

A5: Not possible.

B5: Not possible.

C5: The DATA stream has been split. Split the METADATA range link into 2 METADATA range links. Associated with the already existing start time, create a new end time. This must describe the last picture or audio frame decodable within the earlier DATA stream fragment. Typically this is referenced by a time stamp. Associated with the already existing end time, create a new start time. This must describe the first picture or audio frame decodable within the DATA stream. Typically this is referenced by a time stamp. Ensure that the both METADATA range links are referencing to the new UUIDs.

D5: See A1.

A6: The position is lost, else delete the METADATA range link. If the metadata belonging to the link does not have any other link and if it is not protected against deletion, then delete also the metadata, cf. FIG. 5.

B6: See A6.

C6: See A6.

D6: See A6.

When the complete data stream 104 is deleted it can be of interest to a user to still keep some items of the essential metadata information. An example for such situation is given in FIG. 5. In this example the data stream 104 contains the movie 'Casablanca'. The metadata of data stream 104 has a user annotation with a protection flag set, a MD teletext, a core MD summary and a MD DVB-SI service information. The core MD summary has pointers to the data stre104 and to other metadata like MD teletext and MD DVB-SI.

Figure 5:
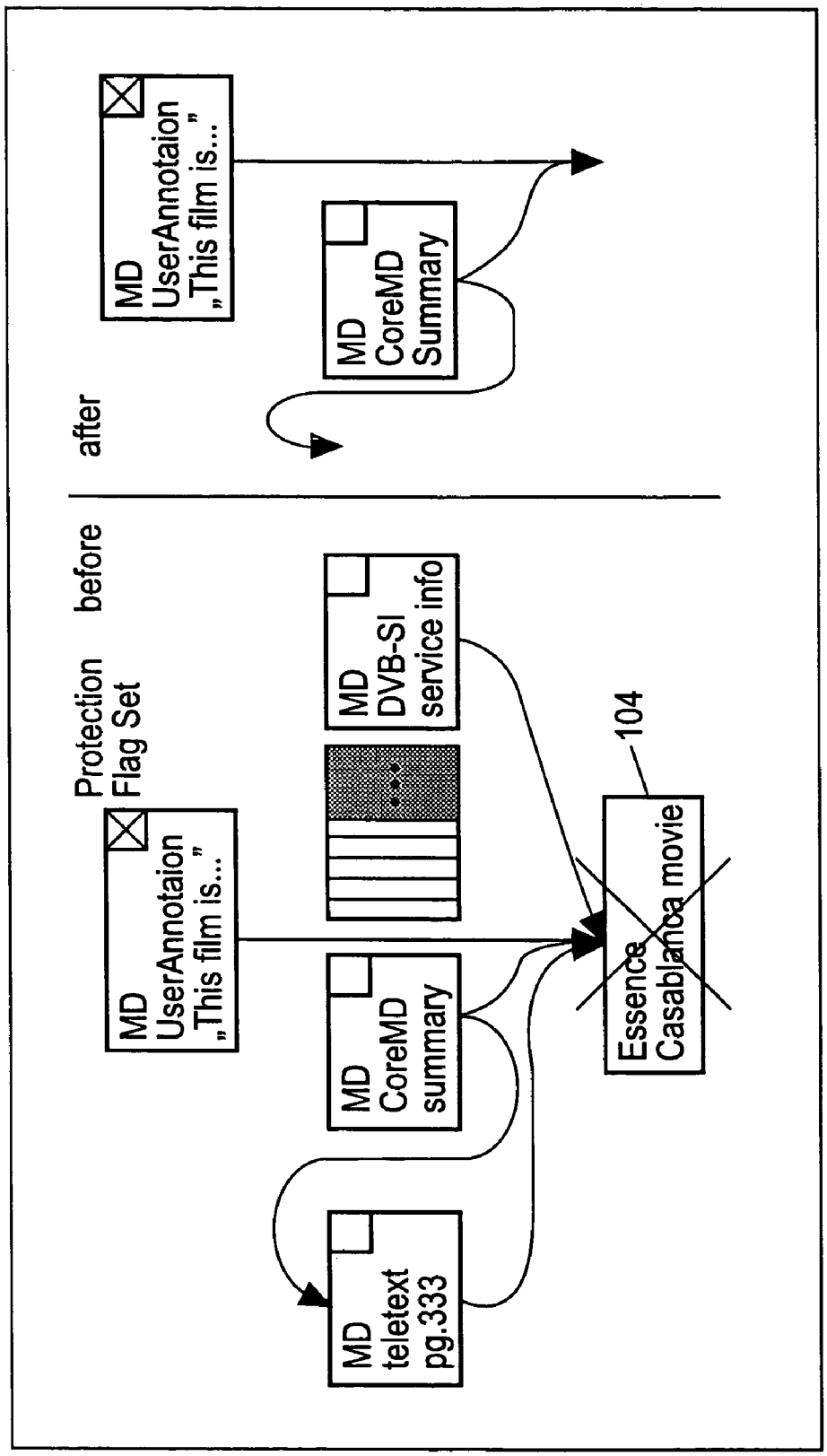
FIG. 5 deletion of the data stream while keeping certain metadata.

The right hand side of FIG. 5 shows metadata after having deleted data stream 104. Only the user annotation which is protected by the corresponding flag and the core and the summary which has pointers to other metadata entries have survived the erasure. This way the essential metadata information is kept for further use while obsolete metadata and memory is freed for other use.

It is important to note that any of the above described metadata updating operations can be performed automatically on the basis of the updating operation determined by the decision matrix, if any. However it is also possible to involve the user in the updating process, for example by outputting the suggested updating operation on the user interface for the user's confirmation, modification or declination.

What is claimed is:

1. Method of editing a data stream, the data stream having a first unique identifier of an identifier space and having assigned metadata, the metadata comprising meta information and a metadata link, the metadata link comprising the first unique identifier and at least one data packet identifier, said method comprising:

performing an editing operation on the data stream;

assigning a second unique identifier of the identifier space to the edited data stream; storing the first unique identifier as history data for resolving links of edited data and corresponding metadata; and using a decision matrix for updating the metadata link in accordance with the editing operation, wherein said decision matrix comprises information of at least two cases of affected metadata links in one direction of said decision matrix and at least two cases of stream editing operations in a second direction of said decision matrix, and corresponding cross points in said decision matrix which determine what respective update to make to said metadata link.

2. Method according to claim 1, wherein the data stream is at least one of an audio and a video stream.

3. Method according to claim 1, the unique identifier is a universal unique identifier.

4. Method according to claim 1, the editing operation being at least one of: a cut head, cut tail, split, and cut and merge operation.

5. Method according to claim 1, wherein the resolving of links comprises mapping the first unique identifier to the second unique identifier in case the first unique identifier is kept in the metadata link in accordance with the decision matrix.

6. Method according to claim 1, wherein the metadata link identifies a range within the data stream.

7. Method according to claim 1, wherein the decision matrix metadata link update specifies whether: the first unique identifier of the metadata link is to be replaced by the second unique identifier, the at least one data packet identifier needs to be shifted, the metadata is to be split, or the metadata is to be deleted.

8. Method according to claim 1, wherein an updating operation determined by means of the decision matrix is output as a suggestion for a user.

9. Method according to claim 1, wherein metadata having one or more pointers to other metadata is not deleted if an updating operation for the deletion of metadata is performed.

10. An apparatus for editing a data stream, the data stream having a first unique identifier of an identifier space and having assigned metadata, the metadata comprising metadata information and a metadata link, the metadata link comprising the first unique identifier and at least one data packet identifier, the apparatus comprising:

a means for performing an editing operation on the edited data stream;

a means for assigning a second unique identifier of the identifier space to the data stream; a means for storing the first unique identifier as history data for resolving links of edited data and corresponding metadata; and a decision matrix for updating the metadata link in accordance with the editing operation wherein said decision matrix comprises information of at least two cases of affected metadata links in one direction of said decision matrix and at least two cases of stream editing operations in a second direction of said decision matrix, and corresponding cross points in said decision matrix which determine what respective update to make to said metadata link.

* * * * *

UNITED STATES PATENT AND TRADEMARK OFFICE
CERTIFICATE OF CORRECTION

PATENT NO. : 7,653,284 B2
APPLICATION NO. : 10/879842
DATED : January 26, 2010
INVENTOR(S) : Adolph et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Twenty-third Day of November, 2010

David J. Kappos
*Director of the United States Patent and Trademark Office*